Oct. 7, 1952 — A. T. S. BABB — 2,613,249
TESTING INSTRUMENT
Filed Dec. 23, 1948 — 3 Sheets-Sheet 3
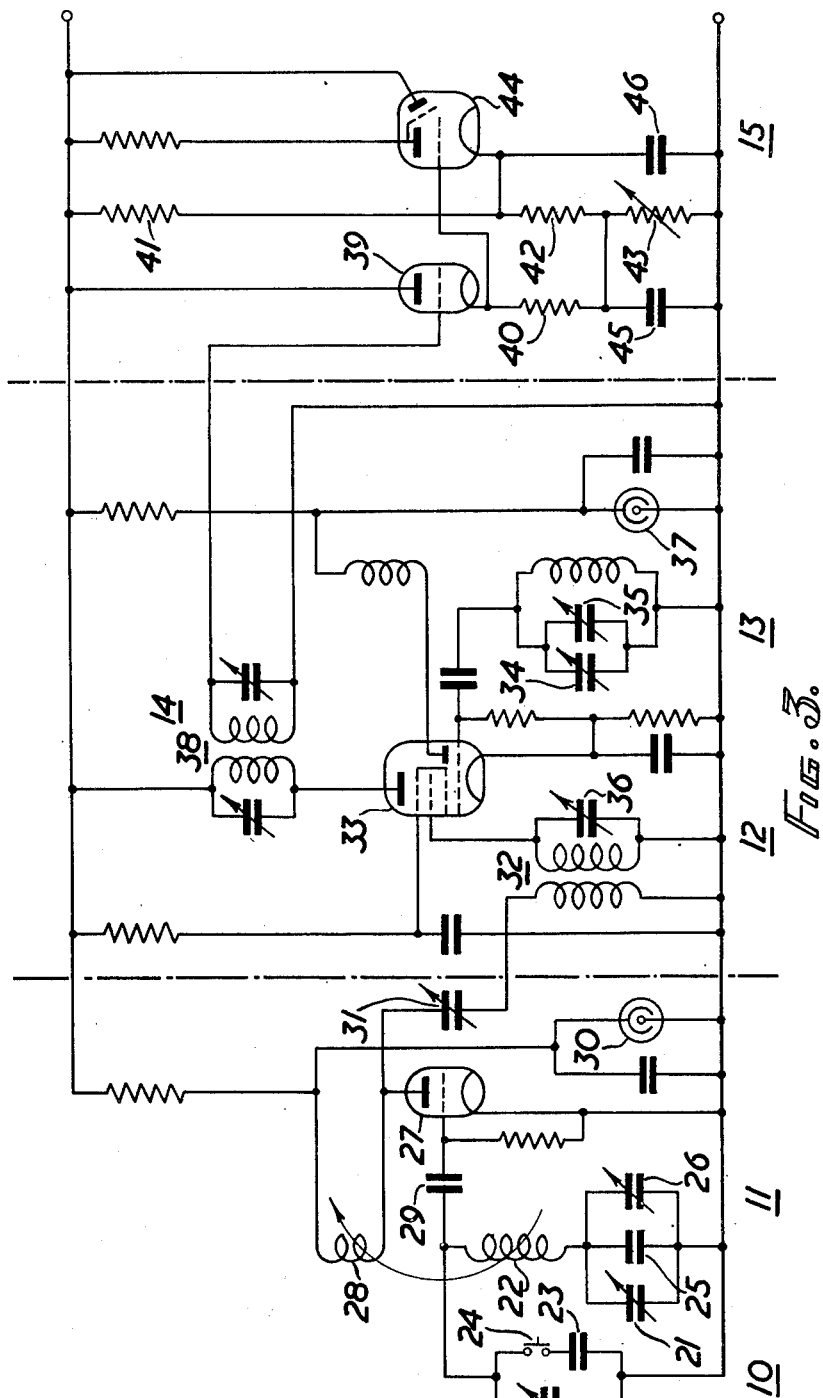
Inventor
Alfred Thomas Symonds Babb Patented Oct. 7, 1952

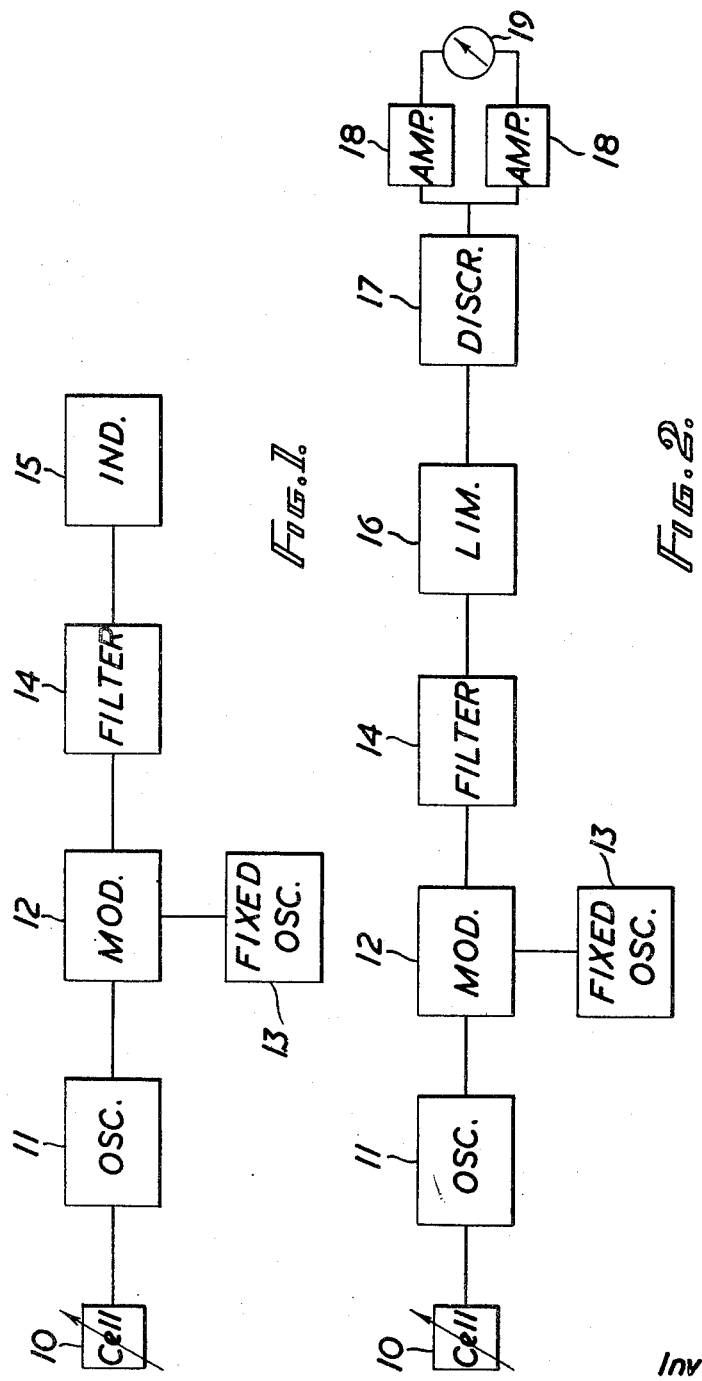

2,613,249

UNITED STATES PATENT OFFICE 2,613,249

TESTING INSTRUMENT

Alfred Thomas Symonds Babb, Wembley, England, assignor to J. Lyons and Company Limited, London, England, a British company Application December 23, 1948, Serial No. 67,025
In Great Britain September 9, 1947

2 Claims. (Cl. 175—183)

This invention relates to apparatus for the indication or measurement of the moisture content of granular or pulverant materials.

In a known type of hygrometer for this purpose the operation of the instrument depends upon the fact that the moisture content affects the specific inductive capacity of the material under test. The instrument has therefore involved a condenser forming a cell into which the material is introduced, and the change of capacity of the condenser causes a change in the frequency of a tuned circuit of which the condenser forms part.

I have found that instruments of this kind, as at present commercially available, do not perform satisfactorily and this is especially so at low percentages of moisture, and it is the object of the invention to provide an instrument which will perform satisfactorily over an extended range including low contents.

The present invention consists of a moisture content responsive instrument comprising a tuned circuit the frequency of which is varied by the material under test, means for producing oscillations of the frequency of said tuned circuit, a frequency changing device for changing the frequency variations of said oscillations to corresponding variations of oscillations of lower frequency and a device for indicating the frequency variations of the oscillations of lower frequency.

In the accompanying drawings are shown certain embodiments and details of the invention; in these drawings, Figure 1 is a block schematic diagram of one embodiment of the invention.

Figure 2 is a block schematic diagram of a modified system.

Figure 3 is a simplified circuit diagram of an embodiment such as is shown in Figure 1.

Figure 4:
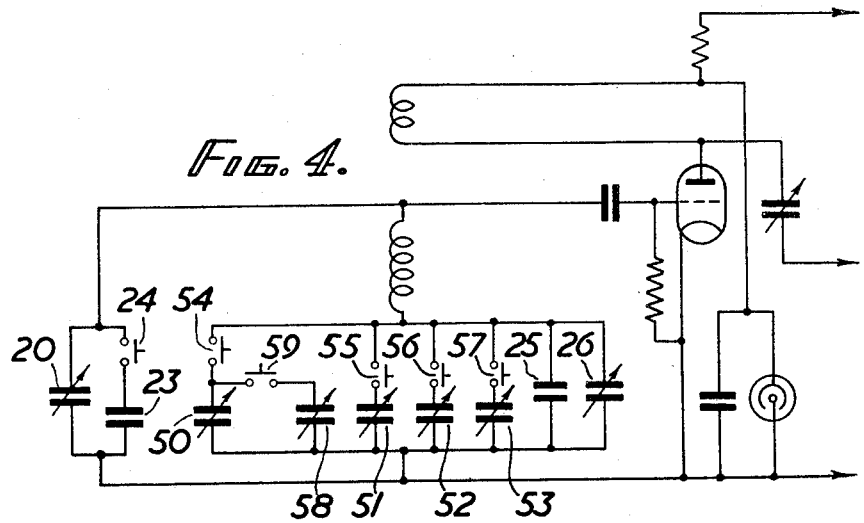
Figure 4 is a simplified circuit diagram of a modified variable-frequency oscillator part of the apparatus of Figures 1 or 2 and Figures 5 and 6 are simplified circuit diagrams of phase discriminator circuits which may be used to replace the latter parts of the arrangement of Figure 3, or used in conjunction with the arrangement of Figure 4.

In the embodiment shown in Figure 1 of the invention the condenser formed by the test cell 10 is included as part of a tuned circuit which is used as the frequency-determining circuit of an oscillator 11. In this way oscillations are produced, the frequency of which is varied by variation of the capacity of the condenser. The oscillations are then fed into a modulator 12, to which are fed also oscillations of a field, but slightly different frequency, generated by a local oscillator 13. One of the modulation's products is a component having a frequency equal to the beat frequency between the two applied signals which is filtered at 14, and the change of beat frequency is indicated or measured in any suitable way at 15. By making the frequency of the tuned circuit high a small change of capacity produces a large change of frequency, and by making the beat frequency low this change of frequency represents a large percentage change, which can therefore be detected with greater accuracy.

Figure 2 shows a somewhat similar arrangement, but which is modified to afford an improved indication or measurement. In this modification the oscillations of oscillator 11 are changed in frequency as before, but after filtering at 14, the lower frequency oscillations are applied to an amplitude limiter at 16 and then to a phase discriminator 17. Amplifiers 18 may then be used to perform an indicating or control function at 19.

In one particular embodiment of the invention there is provided an instrument which is suitable for the measurement of the moisture of powdered foodstuffs such as flour, tea, coffee and the like, or of other materials. Depending upon the size of the test cell used materials in relatively large pieces can also be tested.

In this instrument the test cell comprises two parallel separated metal plates, forming a condenser 20, into which the material under test can be packed under gravity or a standard degree of compression. The condenser is included in series with a variable condenser 21 of substantially larger value and a small inductance 22, forming a tuned circuit. For purposes which will be described hereinafter, the cell condenser 20 is adapted to be shunted by a preset condenser 23, which may be brought into circuit by a press button or similar switch 24, and the variable condenser 21 is shunted by a fixed condenser 25 and a small variable condenser 26. The frequency of the tuned circuit formed by the various condensers and the inductance 22 is of the order of 20 mcs.

The tuned circuit is connected as the frequency-determining circuit of an oscillator stage including a valve 27, having a feed-back coil 28 coupled to the inductance 22, and being self-biased by a grid resistor and condenser 29 in the usual way. In order to avoid incidental frequency variations the anode voltage of the valve is stabilised by a voltage stabiliser 30.

The radio frequency oscillations thus generated are fed through condenser 31 and tuned transformer 32 to a modulator valve 33. This valve may be of any suitable kind, but a triode-hexode or similar electronic mixer may be used with advantage. In this case, the valve may be used to generate also the local oscillations of slightly different frequency which are to be applied to the modulator, and a suitable circuit is indicated in Figure 3. The circuit is conventional in this respect and will not be described in detail, except to point out that the oscillator is variable in frequency by means of two condensers 34, 35, of which one, 34, is ganged with the condenser 36 of the radio frequency input to the valve 33. Condenser 35 is a zero-setting condenser, the use of which will be described hereinafter. The performance of the oscillator stage 13 consisting of the triode section of valve 33 is stabilised by the voltage stabiliser 37.

The frequency of the oscillations from the stage 13 is chosen to differ from the frequency of the first oscillations by an amount considerably lower than the radio frequency; a figure of 400 to 500 kcs. has been found suitable. It may be observed that the lower this difference or beat frequency is chosen, the greater the danger of pull in between the two input circuits of the modulator.

The output circuit of the modulator valve 33 is tuned to the beat frequency by means of a transformer 38 having tuned primary and secondary windings. The voltage which appears across the secondary winding of the transformer is applied to the control grid of a valve 39 connected as an anode bend rectifier; the cathode of the valve is accordingly connected through a resistor 40 to a point of positive potential upon a potential divider composed of resistors 41, 42, 43, the last of which is made adjustable. The cathode of a "magic eye" tuning indicator valve 44 is connected to the junction of resistors 41 and 42, and the grid of this valve is connected to the cathode of valve 39. Bypass condensers 45, 46 are provided for the potential divider. In this way the voltage appearing across the load resistor 40 of the rectifier 39 is applied to the input of the valve 44.

The operation of the circuit will now be apparent. The apparatus is set up so that with the cell empty the beat frequency is exactly equal to the frequency of the tuned output of the modulator. This is effected by setting the variable condenser 21 of the cell tuned circuit to a predetermined setting, say maximum capacity, and then changing the frequency of the second oscillator by means of condenser 35 to give the desired beat frequency as indicated by peak reading or deflection on the valve 44. This setting of the frequency is preferably accompanied by adjustment of the tuning of the input to the modulator, by means of condensers 34 and 36, the tuning of these two circuits being ganged in the manner of the frequency changer circuit of a conventional radio receiver to give a constant difference frequency and the tuned circuit of the oscillator may include a padding condenser to enable this to be done.

The test sample is then weighed and introduced into the cell with standard compression. The frequency of the first oscillations is thereby changed, but by variation of the variable condenser 21 of the cell circuit the frequency of the circuit can be brought back to that which gives the same beat frequency, as indicated by the indicator, and the variation of the condenser necessary for this adjustment is a measure of the moisture content of the sample. Different charts or scales may be provided for different substances, the charts being prepared by direct calibration. Different cells may also be provided for use with materials of different physical size. The cell may be constructed with an insert of insulating material, particularly where the cell is of large size. A large cell is of advantage in that it is easier to fill, and the insert eliminates any effects due to variations of resistance which may exist between the plates of the cell.

The cell, as described above, is included in series with a larger variable condenser 21 in the tuned circuit. The capacitance of the two condensers in combination is then not greater than that of the smaller condenser, which is the cell, and so a comparatively large and robust condenser can be used for the variable condenser whilst still giving a fine control of frequency adjustment. The rate of tuning is further decreased by shunting the variable condenser 21 with the large fixed condenser 25, and this can be increased as desired subject only to the fact that the finer the control effected, the less is the total range of variation.

For setting up purposes, the condenser 23 in parallel with the cell may be introduced into the circuit, this condenser having a standard, predetermined value. Since the rate of change of variation of tuning of the cell circuit and hence calibration depends upon various factors it is advantageous to include the expander control, provided by the further small variable condenser 26 in parallel with the larger variable condenser 21 of the cell circuit. With the standard in circuit the expander control can then be used to adjust the instrument until the variation due to the standard can be caused to give a standard variation.

The instrument described works very satisfactorily but has the practical disadvantage of requiring setting-up for each material to be tested. In Figure 4, however, is shown a modification which avoids this and which enables the apparatus to be set up initially for a series of tests, whereafter any one test can be carried out without repetition of the setting-up process. With this modification the instrument is adapted to operate over various limited ranges, each range being for a particular substance. Accordingly, the condensers 20, 23, 25 and 26 are incorporated as before, but additional condensers 50, 51, 52, 53 controlled by push button switches 54, 55, 56, 57 serve the same purpose as condensers 21; switches 24 and 54 are ganged. Each condenser 51, 52 or such further condensers as may be desired corresponds to a different substance, or it may be to a different condition of the substance, and the condensers are adjusted so that with say dry material or material having a given moisture content inserted in the cell, the oscillator frequency gives the maximum output on the indicator. Calibration condensers such as 58 may be included under the control of further push buttons such as 59.

Figure 5:
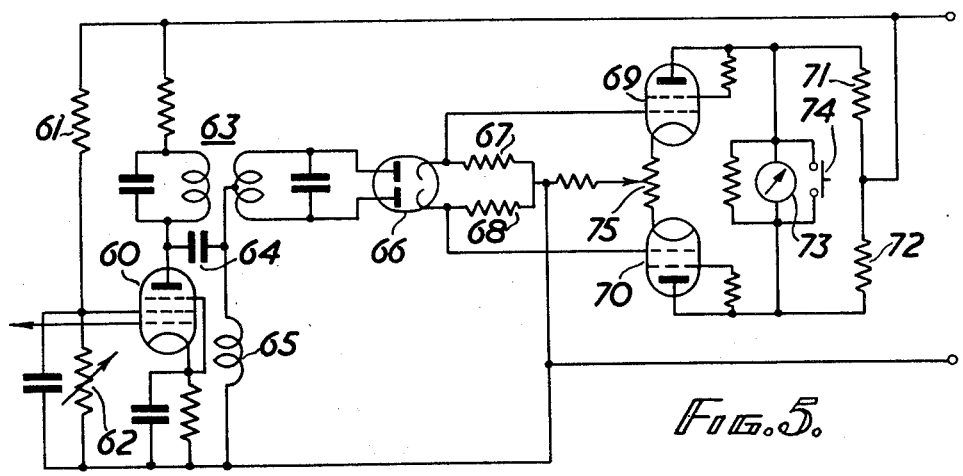

At this point it may be observed that the indicator arrangement of Figure 3 does not indicate the sense of change produced in the oscillator circuit; if the circumstances of use of the arrangement of Figure 3 involves decreases as well as increases of frequency the indicator must be made accordingly. A suitable indicator for this purpose is shown in Figure 5.

This form of indicator is of the type shown in block diagram form in Figure 2 and comprises a valve 60 of pentode type operated with a low screen grid voltage derived from a potential divider formed by resistors 61, 62, of which the latter is adjustable. The valve receives input from the modulator stage, and its output includes a tuned transformer 63 the centre point of the secondary winding of which is coupled to one end of the primary winding through a condenser 64 with a shunt inductance 65. The ends of the secondary winding are fed to a double diode valve 66 having load resistors 67, 68. In manner known per se, the voltages appearing across the diode loads are equal and opposite when the signal applied to the valve 60 is equal to the frequency of the tuned transformer; when the frequency is different, the voltages appearing between the diode cathodes represents in polarity and magnitude the sense and magnitude of the departure of the frequency from equality.

The voltage thus appearing across resistors 67, 68 are applied to two balanced D. C. amplifier valves 69, 70 having anode loads 71, 72; an indicating instrument 73 can then be used as a centre-zero indicator of resonance. A push button 74 may be used for instrument protection and a balancing resistor 75 may be included for valves 69, 70.

With the centre-zero type of indicator the moisture content meter may be set up for indicating tolerance limits of moisture content; in this case the instrument is adjusted until a test sample of the desired or average moisture content indicates zero, and thereafter test samples may be inserted in the cell and will produce an indication above or below the zero mark in accordance with their departure from standard or average moisture content.

Figure 6:
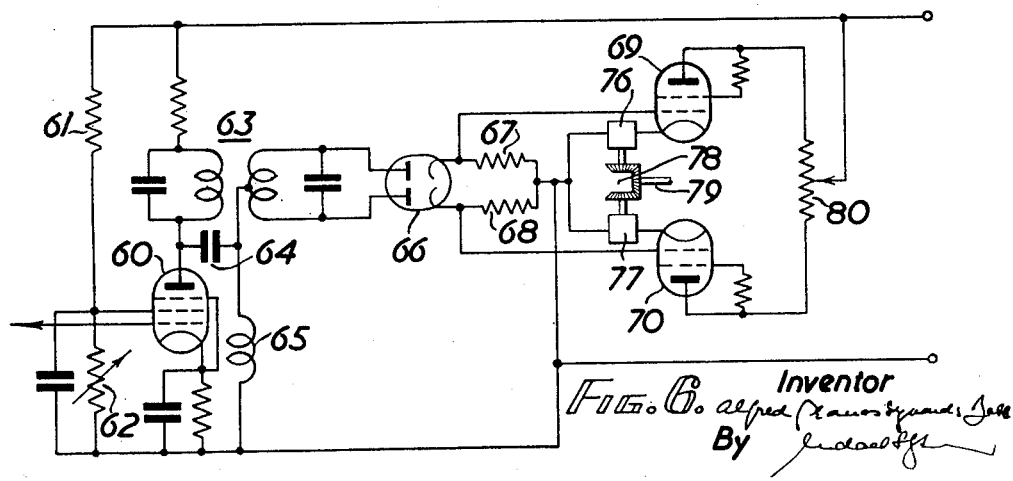

The indicator of Figure 5 can be readily adapted for control purpose or operating indicators or recorders requiring more power than can be derived from the instrument 73, by the arrangement shown in Figure 6. In this modification the anode current of the valves 69 and 70 are passed through the windings of two D. C. motors 76, 77 respectively, and the motors drive a differential bevel gear 78 having an output shaft 79. When one motor produces a greater torque than the other the shaft 79 will rotate, and its speed and direction of rotation will be an indication of the frequency departure. In Figure 6 an alternative method of balancing the anode currents by means of a tapped resistor 80 is shown.

The shaft 79 may be used for various control functions. For example the shaft may be used as an automatic tuning control arrangement operating to restore the frequency departure which initiates its movement. This is particularly advantageous for continuous flow testing, when the test cell is replaced by one which permits the material to pass through it continuously. The control shaft 79 may then in addition operate a recorder, or a monitoring device.

Alternatively the control shaft may operate an automatic drying system or may be used to control the speed or duration of a process which is related to moisture content.

The instrument described may be formed in separated portions comprising a main portion with power supplies and the modulator and succeeding stages, and a remote portion including the cell and oscillator valve. With this modification it is preferable not to restore the frequency variation, but to use a direct reading type of instrument such as is afforded by the arrangement of Figures 2 and 5. The push button switches 54, 55 etc. in the oscillator stage may then be relay operated, if these are incorporated but in the interests of simplicity the cell may be used without condenser 23 or its equivalent. This permits the remote unit to be coupled to the main unit with simple cable connections.

The test cell may be replaced by one using two coplanar electrodes, one preferably surrounding the other. This cell, which forms the subject of my co-pending application No. 23,043/48, filed in Great Britain, permits a rough determination of the moisture content of substances contained in non-metallic containers without opening the containers, the cell being merely placed against the container.

I claim:

1. A moisture content meter, comprising in combination, a cell for the material under test, said cell having a capacitance; a first manually variable capacitor; a second manually variable capacitor connected in parallel with said first variable capacitor; an inductor, said cell, said variable capacitors in parallel, and said inductor being connected in series so as to form a high frequency resonant circuit; a capacitor having a predetermined capacitance; manually controllable switch means for effectively connecting said capacitor having a predetermined capacitance in said resonant circuit; means for inducing in said resonant circuit electric oscillations of frequency equal to the resonance frequency of said resonant circuit; a generator of oscillations of frequency different from the high frequency of said resonant circuit; means for mixing oscillations from said resonant circuit with oscillations from said generator to produce a beat note of low radio frequency; filter means for selecting said beat note; and indicating means responsive to a change of frequency of the beat note produced by said mixing means.

2. A moisture content meter, comprising in combination, a cell for the material under test, said cell having electrodes between which exists an electrical capacitance variable in accordance with the moisture content of said material; a connection for maintaining one of said electrodes at a predetermined potential; a first manually variable capacitor having two electrodes; a connection for maintaining one electrode of said first variable capacitor at the predetermined potential; an inductor, said inductor, said first variable capacitor and said cell being connected effectively in series; a second manually variable capacitor in parallel with said first variable capacitor, said capacitors, said cell, and said inductor together forming a high frequency resonant circuit; a capacitor having a predetermined capacitance; switch means for connecting said capacitor having a predetermined capacitance in parallel with said cell; a vacuum tube; circuit means for operating said tube and said resonant circuit as a first oscillation generator, said resonant circuit forming the frequency determining circuits of said first generator; a second oscillation generator generating oscillations having a frequency different from that of the oscillations generated by said first generator; means for mixing the oscillations generated by said generators so as to produce a beat note of low radio frequency; and indicating means responsive to the frequency of the beat note produced by said mixing means.

ALFRED THOMAS SYMONDS BABB.

REFERENCES CITED

The following references are of record in the file of this patent:

UNITED STATES PATENTS

| Number | Name | Date |
|---|---|---|
| 1,878,109 | Clark | Sept. 20, 1932 |
| 2,146,073 | Jennens et al. | Feb. 7, 1939 |
| 2,266,114 | Bartlett | Dec. 16, 1941 |
| 2,387,496 | Cornelius | Oct. 23, 1945 |
| 2,422,742 | Odessey | June 24, 1947 |
| 2,512,372 | Pakala | June 20, 1950 |
| 2,516,768 | Grob et al. | July 25, 1950 |

OTHER REFERENCES

Electronics, October 1945, pages 114 and 115, article by Jupe.